(12) United States Patent
Joudareff et al.

(10) Patent No.: US 12,092,041 B2
(45) Date of Patent: Sep. 17, 2024

(54) METHOD FOR MONITORING THE OPERATING STATE OF A HYDRO-MECHANICAL UNIT

(71) Applicant: SAFRAN AIRCRAFT ENGINES, Paris (FR)

(72) Inventors: Arnaud Bernard Clément Thomas Joudareff, Moissy-Cramayel (FR); Guilhem Alcide Auguste Foiret, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 457 days.

(21) Appl. No.: 17/423,349

(22) PCT Filed: Mar. 19, 2020

(86) PCT No.: PCT/EP2020/057694
§ 371 (c)(1),
(2) Date: Jul. 15, 2021

(87) PCT Pub. No.: WO2020/188059
PCT Pub. Date: Sep. 24, 2020

(65) Prior Publication Data
US 2022/0003173 A1    Jan. 6, 2022

(30) Foreign Application Priority Data
Mar. 19, 2019  (FR) ..................... 1902801

(51) Int. Cl.
*F02C 9/26*     (2006.01)
*F02C 7/232*    (2006.01)

(52) U.S. Cl.
CPC .............. *F02C 9/263* (2013.01); *F02C 7/232* (2013.01); *F05D 2260/80* (2013.01)

(58) Field of Classification Search
CPC .... F02C 9/263; F02C 9/32; F02C 9/36; F02C 9/38; F02C 9/28; F02C 7/232; F05D 2260/80; G01F 1/86
See application file for complete search history.

(56) References Cited

U.S. PATENT DOCUMENTS

2005/0043905 A1*   2/2005   Vary ................. F02C 9/26
                                               702/45
2008/0243352 A1*  10/2008   Healy ............... F02C 9/26
                                               701/100

(Continued)

FOREIGN PATENT DOCUMENTS

FR    2 966 518 A1    4/2012
FR    3 053 396 A1    1/2018

*Primary Examiner* — Jason H Duger
(74) *Attorney, Agent, or Firm* — BIRCH, STEWART, KOLASCH & BIRCH, LLP (57) ABSTRACT

A method for monitoring the operating state of a turbomachine hydro-mechanical unit of an aircraft comprising:
 a metering valve, comprising a movable metering part,
 a control valve, configured to control the flow rate (Q) through the metering valve,
 a flow rate meter able to measure the mass flow rate (Q) of passing fuel, characterized in that a monitoring module is configured for implementing the following steps:
determining a reconstructed flow rate based on the position of the movable part and on a measurement of the density of the fuel,
calculating a residue, and comparing said residue to a determined threshold value,
determining an abnormal operating state of the hydromechanical unit depending on the result of the comparison.

8 Claims, 5 Drawing Sheets

(56) References Cited

U.S. PATENT DOCUMENTS

| | | | |
|---|---|---|---|
| 2009/0173078 A1* | 7/2009 | Thatcher | F02C 9/20 |
| | | | 60/773 |
| 2020/0123986 A1* | 4/2020 | Hahn | G05D 7/0126 |
| 2020/0262578 A1* | 8/2020 | Viscotchi | F02C 7/22 |

* cited by examiner

METHOD FOR MONITORING THE OPERATING STATE OF A HYDRO-MECHANICAL UNIT

FIELD OF THE INVENTION

The invention relates to the field of fuel metering units, or hydro-mechanical units on aircraft engines, in particular turbomachines.

The invention relates in particular to a method for monitoring the operating state of a turbomachine hydro-mechanical unit of an aircraft.

PRIOR ART

Current engines are equipped with a fuel metering unit, a hydro-mechanical unit more commonly called an FMU.

The hydro-mechanical unit has a plurality of functions. It provides fuel metering, i.e. the flow rate information which arises from a need dictated by a control unit of the aircraft depending on the flight phase, with the relative precision required. It also allows cutting off the fuel resulting from a pilot command, and the cutting off and/or regulation of the fuel flow rate in the emergency case of an overspeed detected by a speed sensor of the of the high and/or low pressure portion of the engine. Finally, it retains a minimum pressure level in the fuel circuit and allows the control of variable geometries actuated with the power available in the circuit.

Once the product is mounted and calibrated, a hydro-mechanical unit undergoes and ATP (Acceptance Test Procedure) to verify that its performance is consistent with its specification.

Figure 1:
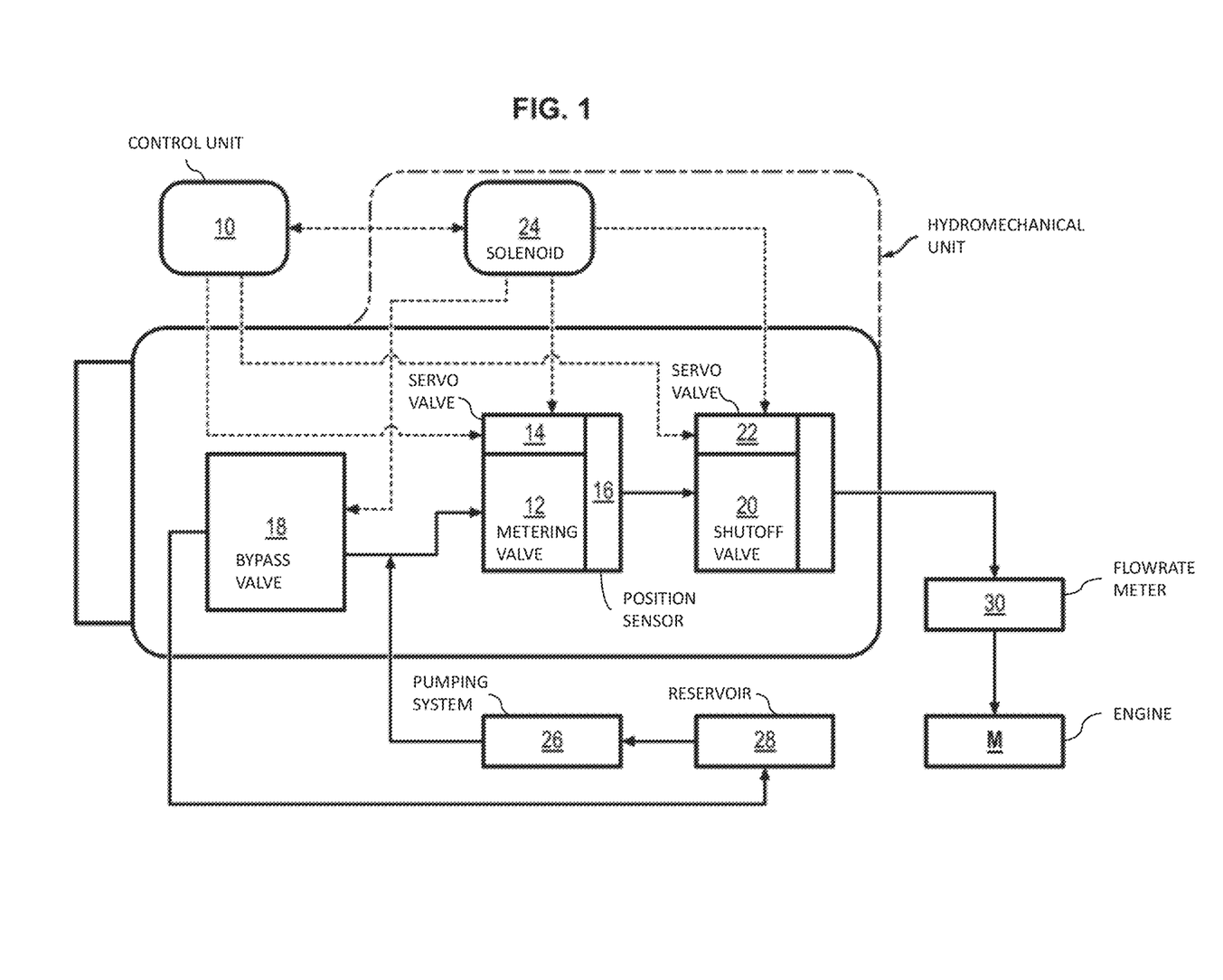
FIG. 1 shows an architecture of a hydro-mechanical unit as known from the prior art.

As illustrated in FIG. 1, a hydro-mechanical unit B, controlled by a control unit 10 of the engine of the aircraft, consists of several subsystems:
- a metering valve 12 or FMV for Fuel Metering Valve, which has as its main function to control the injection flow rate by the gradual blocking of a calibrated fuel passage orifice by means of a movable part, generally called a shutter,
- a servo-valve 14 linked to the metering device allowing the valve 12 to be set in motion,
- a position sensor 16 associated with this valve 12 (FMV) to communicate its position to the computer in real time,
- a control valve 18 or Bypass Valve, providing recirculation of fuel that is not injected (dep-ending on the flow rate demand). The valve 18 also serves for holding constant the upstream to downstream fuel pressure differential ΔP of the metering valve 12; it typically consists of a purely passive device comprising a movable shutter acting against the action of a spring calibrated to a predetermined value of the differential ΔP to be maintained. The shutter is generally perforated so as to release fuel into a pipe leading to the recirculation loop, depending on its equilibrium position against the action of the spring,
- a shutoff valve 20 or HPSOV for High-Pressure Shutoff Valve, allowing or preventing the injection of the fuel,
- an associated servo-valve 22, which controls the shutoff valve and therefore the injection of fuel,
- a solenoid 24, called OSS for Overspeed Solenoid, which provides a redundant function of stopping the injection of fuel, used in the event of an emergency.

The metering valve 12 thus constitutes a controlled valve for metering the fuel flow rate sent to the injectors of the combustion chamber of the engine.

The hydro-mechanical unit B thus feeds the engine M with fuel.

All these different elements operate in interrelation, under the control of the control unit 10 which controls them one by one. The dotted arrows symbolize information transfers. The solid arrows symbolize fluid (fuel) transfers.

The hydro-mechanical unit B has the benefit of an associated fuel circuit providing fuel feed by an associated pumping system 26 from a reservoir 28.

A fuel circuit internal to the equipment also allows the hydraulic actuation of the actuators involved in the operation of the hydro-mechanical unit.

A flow rate meter 30, called WFM for Water Flow Monitor, is integrated into the engine perimeter, in order to allow knowing the fuel consumption at the output of the hydro-mechanical unit B.

To adjust the flow rate setpoint, it is necessary to calculate a flow rate called a reconstructed Qr. This flow rate corresponds to the theoretical flow rate passing through the metering valve. In particular, the following fundamental relation is used:

$$Qr = K_S S \sqrt{\rho \Delta P} \qquad \text{[Math. 1]}$$

Ks is a parameter considered to be linked to the geometry of the valve, S is the passage cross section, ρ is the mass per unit and ΔP is the pressure difference at the terminals of the metering valve.

The hydro-mechanical unit is a complex apparatus, the different components of which can become worn over time and modify the metering law (metered flow rate as a function of the position of the metering device) which was verified during production tests.

A progressive degradation will probably not be revealed in the behavior of the engine, either in a significant or a dangerous manner. In fact, as a general rule, the thrust supplied by the engines is controlled in a closed loop over the rotation speed of the engine (number of revolutions per minute). If a hydro-mechanical unit degrades and sees its metering law modified, in the stabilized regime the control of the engine will adapt and will compensate for this error.

On the other hand, starting with a certain degree of degradation, this error within the metering law could degrade the operating performance of the engine.

Moreover, certain "control modes" of the engine call upon metering accuracy.

Finally, for its part the starting of the engine uses metering accuracy entirely and solely. Any degradation at the level of the FMU will therefore impact these laws, with as possible consequences the risk of engine surge or flameout.

In addition to the cost of repair or replacement of the apparatus, the operational cost linked to an engine breakdown can prove to be very large for the operating airline.

The earlier a degradation of an engine apparatus is detected, the greater are the chances of accomplishing the maintenance operation before having an operational impact.

DISCLOSURE OF THE INVENTION

The proposed technical solution allows covering these cases of progressive degradation of a metering unit and thus avoid operational events for the company that operates the airplane. For this purpose, the invention proposes a method for monitoring the operating state of a turbomachine hydro-mechanical unit of an aircraft, said hydro-mechanical unit comprising:
- a metering valve, comprising a movable metering part and allowing the generation of a passing flow rate, depending in particular on the position of this movable part,
- a control valve, configured to maintain a predetermined pressure difference at the terminals of the metering valve in order, in particular, to control the flow rate through the metering valve,
- a flow rate meter able to measure the mass flow rate of fuel passing through the metering valve, characterized in that a monitoring module is configured for implementing the method according to the following steps:
- determining a reconstructed flow rate based on the position of the movable part measured by a position sensor of said part, and on a measurement of the density of the fuel,
- calculating a residue corresponding to the difference between the real flow rate measured by the flow rate meter and the reconstructed flow rate, and comparing said residue with a determined threshold value,
- determining an abnormal operating state of the hydro-mechanical unit depending on the result of the comparison.

Advantageously, the method also comprises the following features:
- the steps of determining a reconstructed flow rate, of calculating the residue are implemented for different stabilized points of the flight envelope of the aircraft, allowing obtaining a vector of residues, said vector of residues being compared to a vector of determined threshold values for said different stabilized points in order to determine the operating state of the hydro-mechanical unit;
- said residue is stored in a memory of the monitoring module;
- the hydro-mechanical unit also includes
  - a differential pressure sensor at the terminals of the metering valve,
  - a temperature sensor configured to measure a temperature of the fuel, and in which the reconstructed flow rate is also determined based on differential pressure data measured by the differential pressure sensor and temperature data measured by the temperature sensor;
- the determination of an abnormal operating state of the hydro-mechanical block includes, for the measurements of temperature, and/or of density, and/or of the position of the metering device, and/or of differential pressure, the steps of
  - comparing at least one of said measurements to a nominal value interval of a sensor from which the measurement is obtained, and
  - determining an abnormal operating state of the hydro-mechanical unit, corresponding to a breakdown or to a degradation of the sensor, and/or to a breakdown or a degradation of an internal member of the hydro-mechanical unit associated with said sensor, depending on the result of the comparison;
- the method also includes the steps of
  - comparing the measurement obtained from one of said sensors to a determined reference value of said sensor;
  - determining an abnormal operating state of the hydro-mechanical unit corresponding to a degradation of the sensor or of the internal member of the hydro-mechanical unit associated with said sensor, depending on the result of the comparison.
- the reference value is a value representative of the previously measured values;
- the method also includes the steps of:
  - consolidating the reconstituted fuel flow rate by means of the measurements of pressure, temperature, density, with the acquisition of the mass flow rate;
  - comparing the consolidated fuel flow rate to a reference flow rate value; and if the difference is greater than a determined threshold value
  - determining an abnormal operating state of the hydro-mechanical block corresponding to a degradation of the metering law.

The invention also proposes a fuel control device for an aircraft comprising a hydro-mechanical unit, said hydro-mechanical unit comprising:
- a metering valve comprising a movable metering part and allowing the generation of a passing flow rate depending in particular on the position of said movable part,
- a control valve configured to maintain a predetermined pressure difference at the terminals of the metering valve in order in particular to control the flow rate through the metering valve,
- a flow rate meter able to measure the mass flow rate of fuel passing through the metering valve, characterized in that the fuel control device includes a monitoring module configured for the implementation of the method according to the steps previously described.

Advantageously, the control device also includes:
- a differential pressure sensor at the terminals of the metering valve,
- a temperature sensor configured to measure a temperature of the fuel, the monitoring module being configured for the implementation of the method according to the steps previously described.

Advantageously, the invention allows the monitoring of the degradation of the metering law of a hydro-mechanical unit, as well as the aging/degradation of the sub-members of the apparatus. A tracking indicator uses a measurement of the mass flow rate compared to an estimate using measurements of position, of metered fluid density and of pressure difference at the terminals of the dosing device. This indicator can be extracted at different operating points during a flight, and allows trend tracking, i.e. tracking from flight to flight.

All of this monitoring allows preventing and characterizing the aging of sub-members, as well as identifying breakdowns in the process of establishment or dormant. The storage of this diagnosis in memory internal to the apparatus allows the maintenance operator to enrich his knowledge of the equipment over hours of flight, and especially to predict the programmed maintenance in a more agile manner, as well as to evaluate correctly the financial relevance of performing maintenance at the micro level within the equipment or order a replacement.

This monitoring allows anticipating breakdowns of the hydro-mechanical unit before they create an operational impact on the operating airline.

DESCRIPTION OF THE FIGURES

Other features, aims and advantages of the invention will be revealed by the description that follows, which is purely illustrative and not limiting, and which must be read with reference to the appended drawings, in which.

DETAILED DESCRIPTION OF THE INVENTION

Figure 2:
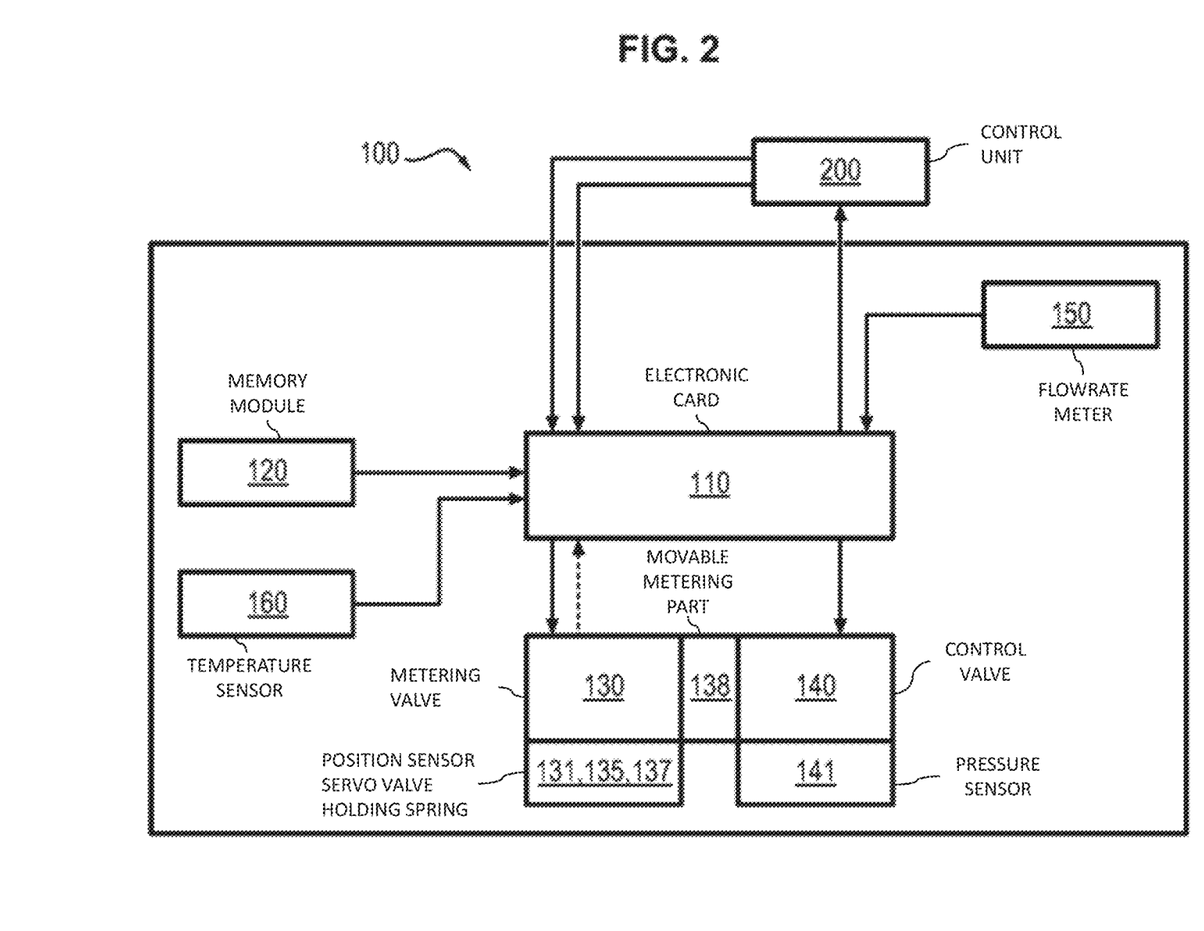
FIG. 2 shows an architecture conforming to an embodiment of the invention.

With reference to FIG. 2, a fuel control device will be described. This device allows managing the fuel feed of a gas turbine of an aircraft (airplane, helicopter, etc.). The gas turbine can be a turbomachine such as a turboprop or a turbojet.

The fuel control device comprises a hydro-mechanical unit 100 and a mass flow rate meter 150. What is meant by a flow rate meter is any measurement apparatus allowing knowing a fluid mass flow rate, here in this case a liquid fuel flow rate.

The hydro-mechanical unit 100 comprises a metering valve 130 which manages the fluid flow. The metering valve 130 comprises a surface, called the opening surface of the fuel metering device S, of variable size, which allows the flow of the liquid. The flow rate Q delivered by the metering valve 130 is therefore in particular a function of the surface S.

The surface S is variable under the control of a servo-valve 135, which controls the movement of a movable metering part 138 for gradually obstructing a metering opening or orifice. A holding spring 137 tends to bring the movable part 138 back to a position by default, generally corresponding to the smallest passage cross section of the metering orifice, i.e. to the minimum fuel flow rate (idle flow rate). A position sensor 131, connected to the electronic card 110, allows knowing the position of the movable part. The position sensor is typically an LVDT (linear variable differential transformer/transducer) sensor. The position of the movable part is therefore known. The surface S can then be calculated, but his step is no longer necessary within the scope of the invention.

There exist different types of metering valves 130, with a conventional metering orifice for example, described in document U.S. Pat. No. 7,526,911B2, or with an exponential orifice, described in documents EP1231368A1 and FR2825120A1. In the case of an exponential orifice, the opening S increases exponentially with the movement of the movable part, which allows better accuracy at a low flow rate.

The hydro-mechanical unit 100 also comprises a control valve 140, providing recirculation of fuel not injected, and also serving to hold constant the upstream to downstream fuel pressure differential ΔP of the metering valve 130. This valve 140 can be identical to the control valve 18 discussed with reference to FIG. 1. A pressure sensor 141, associated with the control valve 140, acquires the differential pressure at the terminals of the metering valve 130. The hydro-mechanical unit 100 also comprises an electronic card 110. The electronic card 110 communicates with the metering valve 130 in both directions: it can send position setpoints to the valve 130 and retrieve data relating to the valve 130. It also communicates with the flow rate meter 150: due to its role as a sensor, the communication takes place in only one direction, so that the flow rate meter 150 can send the measurement of the flow rate (or a datum which must be converted into a flow rate) to the electronic card 110.

The electronic card 110 is also connected to a control unit 200, external to the device. The control unit 200 is typically an electronic control module (ECU) of a FADEC, i.e. a full-authority digital control system which controls the variable geometries (actuators, metering device, etc.) of the aircraft. The control unit 200 is located in the airplane perimeter and is not dedicated solely to the control of the fuel. Conversely, the electronic card 110 is preferably exclusively dedicated to fuel metering and to additional functions. The connection between the control unit 200 and the electronic card 110 is generally accomplished by a connection harness.

A temperature sensor 160 is also provided for. It allows knowing the temperature of the fuel when it passes through the control device. In one advantageous embodiment, the sensor 160 is integrated into the hydro-mechanical unit 100.

The hydro-mechanical unit 100 also comprises a memory module 120 configured to store information relating to the metering valve 130, to the control valve 140 and/or to the flow rate meter 150. The memory module 120 is connected to the electronic card 110 which can retrieve data from it.

In one embodiment, the electronic card 110 has the role of centralizing communications, without calculating or processing data. Consequently, data relating to the metering valve 130, the flow rate meter 150 and the features stored in the memory module 120 are sent by the electronic card 110 to the control unit 200 which carries out the calculations.

In another embodiment, the electronic card 110 has embedded software and can generate commands.

The memory module 120 is comprised in a hydro-mechanical unit 100 to simplify maintenance operations, and to allow replacement of the entire hydro-mechanical unit 100. As the data stored in the memory module 120 belong to each metering valve 130 or each control valve 140 or each flow rate meter 150, a change in one of these elements involves new data.

The data stored in the memory module 120 have as their function to refine the accuracy of the fuel metering. These data are obtained during the reception test of the metering valve 130, the control valve 140 and the flow rate meter 150 and then allow, once in flight, determining a more accurate reconstructed flow rate Qr, which then allows more finally resetting the generated flow rate setpoint.

One of the major advantages is the better accuracy of the fuel metering, which allows, for example in the case of an aircraft engine, reducing the fuel consumption due to a more adjusted dimensioning of the high-pressure compressor of the turbomachine, and thus reducing the quantities of fuel to be taken aboard prior to the flight, including margins. This allows re-dimensioning the aircraft, and, de facto, the power of the engines.

In addition, this has a very favorable impact on the operability of the engine (better acceleration capacity, etc.).

The metering valve 130 is governed by the metering law, which is expressed in the following form:

$$Q = K_s S \sqrt{\rho \Delta P} \qquad \text{[Math. 2]}$$

Where:
Q is the mass flow rate,
$K_s$ a parameter relating to the metering valve 130, which depends on the geometry of the orifice (length, diameter, etc.) as well as its surface finish (roughness, etc.), on the upstream-downstream diameter of the pipe of the metering valve 130, and on the Reynolds number which characterized the flow, S is the passage cross section, as previously introduced, ρ is the density of the fuel, ΔP is the pressure difference at the terminals of the metering valve 130, maintained by the control valve 140.

In practice, ΔP and ρ are functions of the temperature T of the fuel. Consequently, one their effective values are different from those considered for determining the metering law on the test bench, metering errors are necessarily generated in flight.

Thus, to correct this, several characterizations of the metering valve 130 and of the flow rate meter 150 are carried out on the test bench on the ground.

A first characterization consists of knowing the sensitivity of the pressure difference ΔP with respect to the temperature T.

The pressure difference ΔP is constantly controlled by means of a control valve (presented in the introduction and in the present description) which uses a spring with stiffness kΔP. Now this spring dilates as a function of the temperature of the fuel: the stiffness of the spring decreases when the temperature increases. Thus, tests allow knowing the evolution of kΔP as a function of the temperature T, which then allows knowing ΔP as a function of the temperature T.

The memory module 120 therefore comprises a table, in the form of a spreadsheet, associating with different values of temperature T either stiffnesses kΔP to which are associated pressure differences ΔP, or ΔP directly. By means of the value of the temperature T obtained by the temperature sensor 160, it is possible to know a value of ΔP applied to the terminals of the metering valve 130 which is nearest to the real value.

Based on this value ΔP that is obtained, it is thus possible to determine a reconstructed mass flow rate Qr with better accuracy.

At present, a method for monitoring the operating state of a hydro-mechanical unit, according to a first embodiment, will be described.

This method is advantageously implemented by means of a monitoring module 300, associated with the hydro-mechanical unit, and comprising a computer. The term computer designates in particular a controller/unit for controlling physical devices, and usually comprising a process, memories, input/output interfaces. The computer is represented physically by one or more electronic cards implementing its functionalities.

First Embodiment

The monitoring module 300 can be implemented in a control unit of a control device as described in FIG. 1 or 2.

Alternatively, the monitoring module 300 can be implemented in an electronic card 110 of a control device as described in FIG. 2.

The monitoring module 300 is configured to use the measurement of the mass flow rate to detect a drift in the metering law of the hydro-mechanical unit in comparison with the initial calibration, by analyzing several predefined points in the flight envelope: which would be a sign of aging or internal degradation of the hydro-mechanical unit.

In the continuation of the description the method according to the first embodiment is described with reference to a control device according to FIG. 2. Of course, the method can be applied to a control device according to FIG. 1.

The accuracy of the measurements or estimates of mass flow rate are dependent on the metered flow rate; the method is therefore implemented for different stabilized points of the flight envelope, such as: Ground idle/Full throttle/Cruise/Flight idle.

Figure 3:
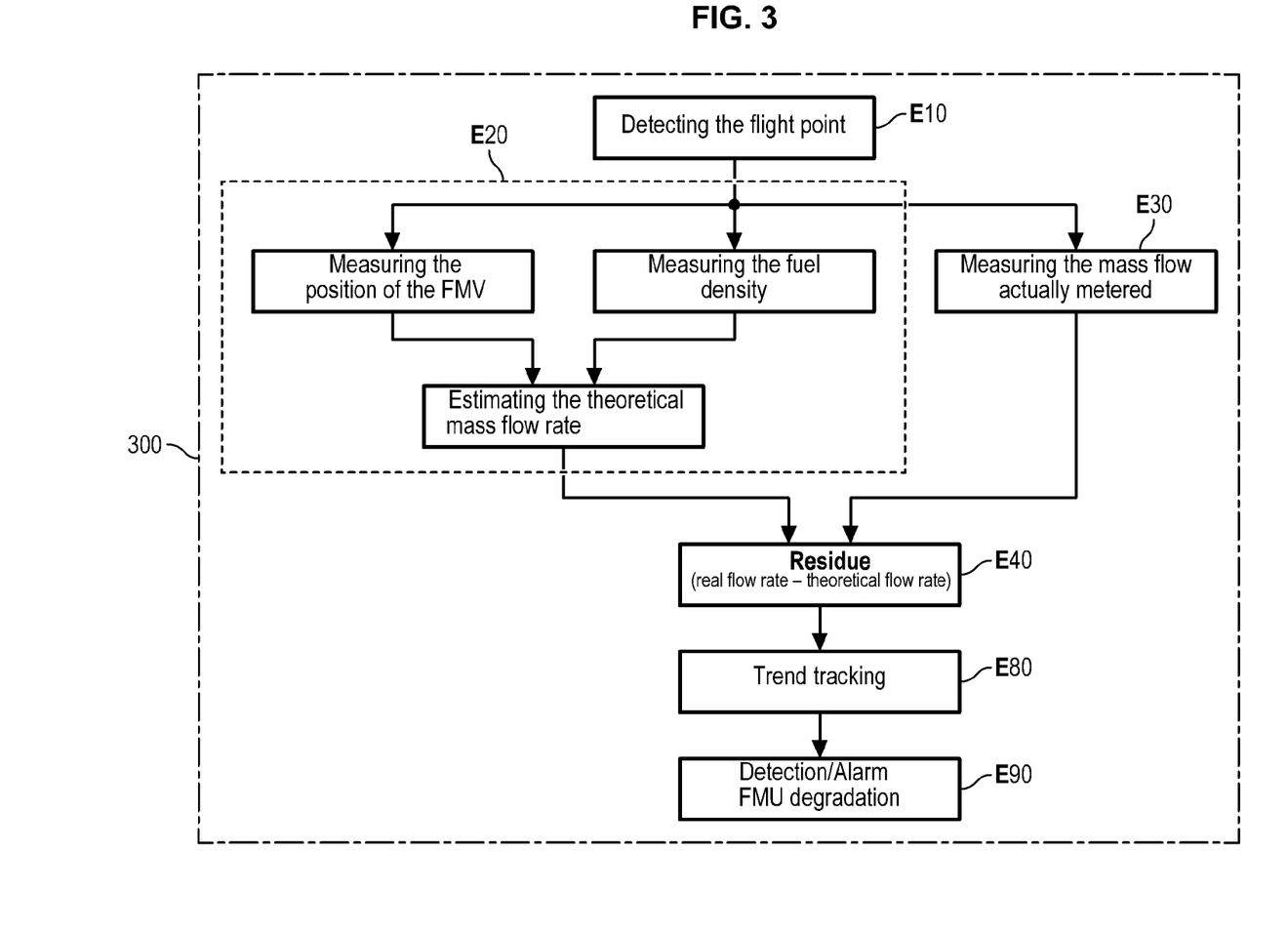
FIG. 3 shows the steps of a method conforming to a first embodiment of the invention.

With reference to FIG. 3, in a first step E10, the monitoring module 300 proceeds with the determination of the flight phase of the aircraft.

The state of the art of the technique allows detecting a flight phase having a sufficiently stable metered flow rate.

In a second step E20, the monitoring module 300 proceeds with the estimate of the theoretical metered flow rate. For this purpose, the position sensor 131 acquires and transmits the position of the movable part 138 of the metering valve 130 to the monitoring module 300.

Simultaneously or alternatively, the flow rate meter 150 acquires a flow rate transmitted to the monitoring module 300.

The flow rate meter 150 can also be used as a densitometer, like for example in publication FR3069021A1, which allows identifying the density of the fuel actually metered (this is dependent on the type of fuel used as well as on its temperature).

As seen previously, based on these measurements, the monitoring module 300 can calculate a so-called reconstructed flow rate Qr. This flow rate corresponds to the theoretical flow rate passing through the metering valve. In particular, the following fundamental relation is used:

$$Qr = K_S S \sqrt{\rho \Delta P} \qquad \text{[Math. 3]}$$

$K_s$ is a parameter considered to be linked to the geometry of the valve, S is the passage cross section, ρ is the mass per unit volume and ΔP is the pressure difference at the terminals of the metering valve. Tests on the test bench allow characterizing $K_S$, which is considered to be constant hereafter, ρ and ΔP are fixed as constants, and S is calculated based on the position of the shutter.

The measurement of the flow rate actually metered is considered to be independent of the estimate of the theoretically metered flow rate.

Then, in a step E30, the monitoring module 300 calculates the difference between the reconstructed flow rate and the measured flow rate. This difference is called a residue: it is this indicator that is tracked from flight to flight to detect a progressive degradation of the metering member.

The residue is compared to a determined alarm threshold value.

The alarm thresholds are generally controlled to correspond to 3 typical differences of the nominal (i.e. without degradation) distribution of the residue, for example with approximately 4.3% offset (over- or under-metering) of the flow rate actually metered with respect to the theoretical flow rate of the metering law.

In other words, it will be possible to detect any degradation of the hydro-mechanical unit causing an offset of 4.3% from the theoretical metering law.

Statistically, it is therefore considered that it will be possible to detect a degradation of the hydro-mechanical unit before the latter risks causing an operational impact on the operating airline (lateness, flight cancellation of engine stoppage in flight) because the engine has been designed while taking into account a metering inaccuracy on the order of 4%.

Nevertheless, this performance can be improved by characterizing the mass flow meter specifically for the engine considered. This thus allows reducing the inaccuracy linked to its measurement and reducing the alarm triggering threshold.

The result of this comparison is categorized by a maximum difference (ε1) defined in the production/reception testing of the member; for several flight points as explained above. A vector of difference data is therefore obtained for the 4 points considered:

$$\varepsilon_1 = \begin{pmatrix} \varepsilon_{GI} \\ \varepsilon_{FP} \\ \varepsilon_{FP} \\ \varepsilon_{FI} \end{pmatrix}$$ [Math. 4]

Corresponding to the phases:

$$\begin{pmatrix} \text{Ground idle} \\ \text{Full throttle} \\ \text{Cruise} \\ \text{Flight idle} \end{pmatrix}$$ [Math. 5]

If one of these indicators is exceeded during the comparison between the reconstituted metered fuel flow rate and the value of the measured fuel flow rate, then a breakdown diagnosis is initialized in a step E60, for example at the end of the flight in order not to reproduced the breakdown in the following flight.

If the residue is less than the determined threshold value, the residue can be stored in a step E50, for example in a memory of the monitoring module 300. The residue can thus be tracked as a trend, i.e. from flight to flight.

Second Embodiment

The monitoring module 300 can be implemented in a control unit or in an electronic card 110 of a control device as described in FIG. 2.

Figure 4:
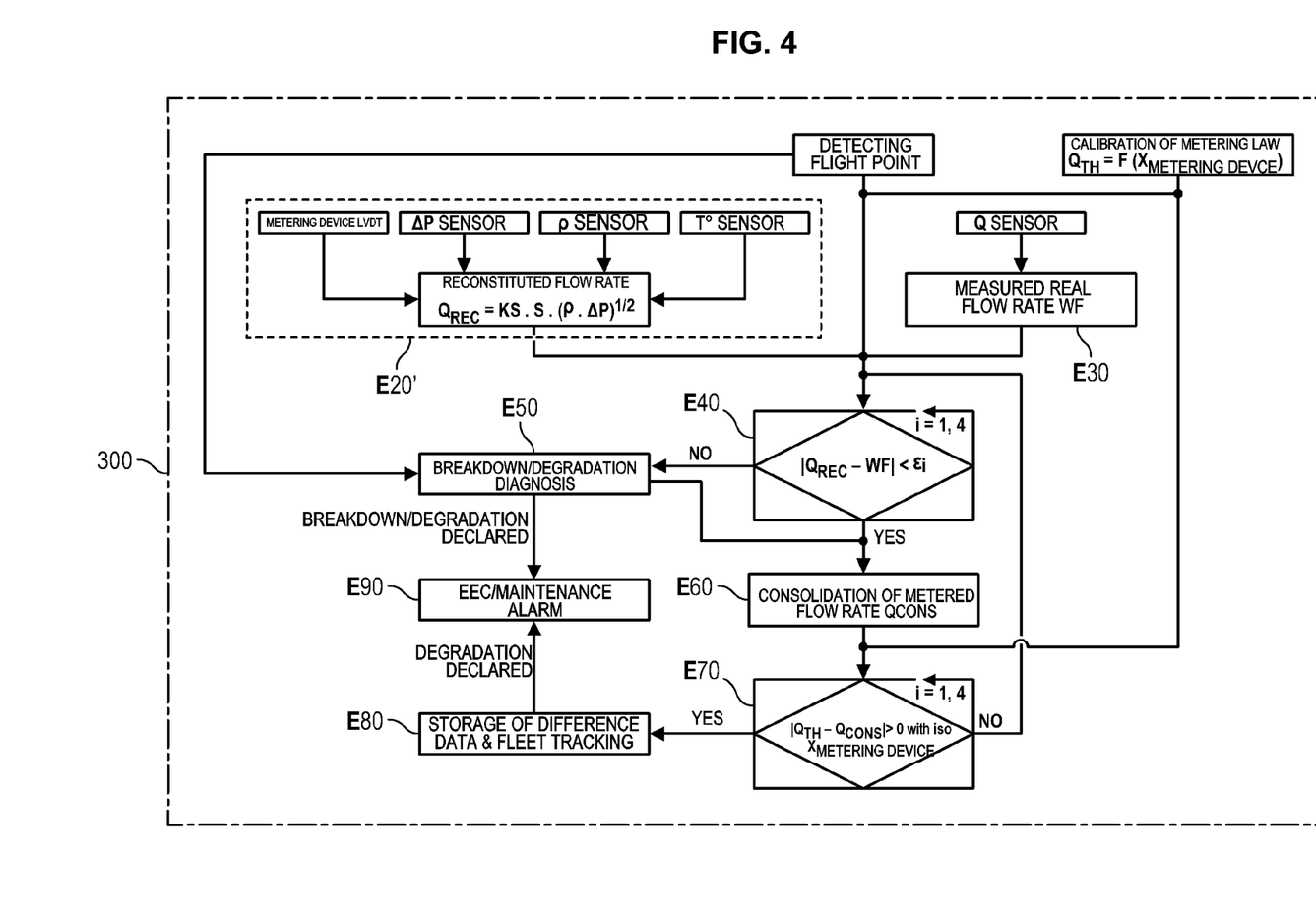
FIG. 4 shows the steps of a method conforming to a second embodiment of the invention.

With reference to FIG. 4, in a step E10, a step is performed of determining detection of the flight point, as in the first embodiment.

In a step E20', the temperature sensor 160 acquires a temperature. Simultaneously or alternatively, the position sensor 131 acquires the position of the movable part 138 of the metering valve 130. Simultaneously or alternatively, the differential pressure sensor 141 acquires the differential pressure at the terminals of the metering valve 130. Simultaneously or alternatively, the flow rate meter 150 acquires a flow rate.

The flow rate meter 150 can also be used indirectly as a densitometer, which allows identifying the density of the fuel actually metered (this is dependent on the type of fuel used as well as on its temperature).

Alternatively, a density sensor distinct from the flow rate meter can be used.

Based on these measurements, the monitoring module 300 can calculate a so-called reconstructed flow rate Qr. This flow rate corresponds to the theoretical flow rate passing through the metering valve. In particular, the following fundamental relation is used:

$$Qr = K_S S \sqrt{\rho \Delta P}$$ [Math. 6]

Ks is a parameter considered to be linked to the geometry of the valve, S is the passage cross section, ρ is the mass per unit volume and ΔP is the pressure difference at the terminals of the metering valve. Tests on the test bench allow characterizing $K_S$, which is considered to be constant thereafter, ρ and ΔP are fixed as constant, and S is calculated based on the position of the shutter.

The measurement of the flow rate actually metered is considered independent of the estimate of the flow rate theoretically metered.

Thereafter, as in a step E30 and E40 of the first embodiment, the monitoring module 300 calculates the difference between the reconstructed flow rate and the measured flow rate. This difference is called a residue: it is this indicator which is tracked from flight to flight to detect a progressive degradation of the metering member.

The result of this comparison is categorized for a maximum difference (ε1) defined in a production/reception test of the member; for several flight points as explained above.

A vector of difference data is therefore obtained for the four points considered:

$$\varepsilon_1 = \begin{pmatrix} \varepsilon_{GI} \\ \varepsilon_{FP} \\ \varepsilon_{FP} \\ \varepsilon_{FI} \end{pmatrix}$$ [Math. 7]

Corresponding to the phases:

$$\begin{pmatrix} \text{Ground idle} \\ \text{Full throttle} \\ \text{Cruise} \\ \text{Flight idle} \end{pmatrix}$$

If one of these indicators is exceeded during the comparison between the reconstituted metered fuel flow rate and the value of the fuel flow rate acquired by the main controller, then a breakdown diagnosis is initialized in a step E50, for example, at the end of the flight, in order not to reproduce the breakdown in the following flight.

Figure 5:
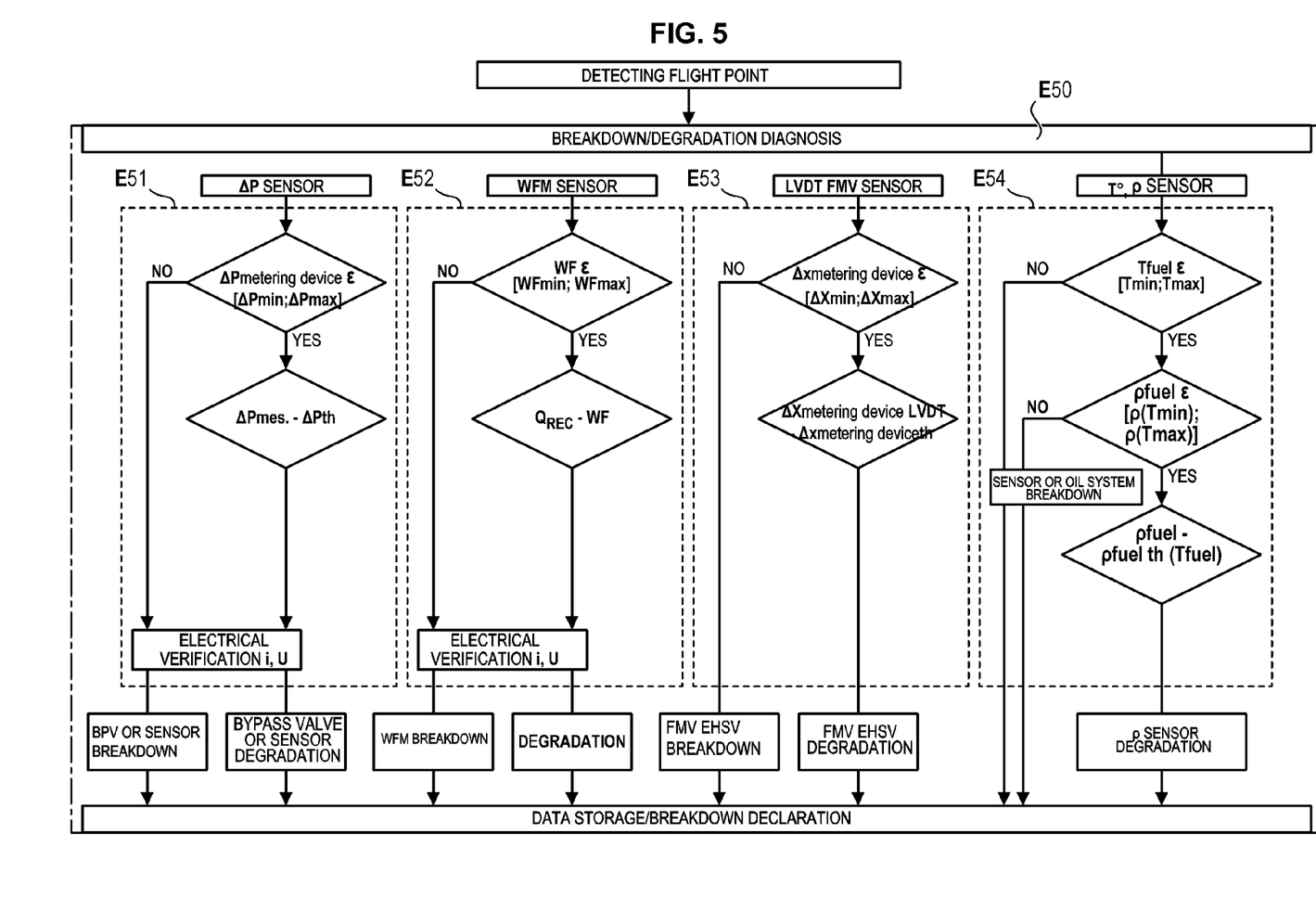
FIG. 5 shows in more detail the steps of a method conforming to a second embodiment of the invention.

With reference to FIG. 5, in addition to the detection of an internal breakdown, based on the analysis of the metering performance of the hydro-mechanical unit, the monitoring module 300 can also determine whether the abnormal sensor values (outside the range of operation predefined during design) are not due to breakdowns in the hydraulic circuit itself. The analysis of degradation and of breakdowns can therefore be performed on the internal members of the hydro-mechanical unit.

The modification of the metering law can also arise from the poor pressurization of the metering member. In fact, the metering device is dimensioned based on the assumption that ΔP is constant at its terminals, accomplished by a hydraulic member: the control valve; which makes its operation predominant in fuel metering.

By using a ΔP sensor at the terminals of the metering device, it is easy to verify the operation of the control valve, and to eliminate from that member potential sources of degradation.

One example of a breakdown or of degradation would be a problem with the force of the spring that is calibrated so as to have a constant ΔP.

The degradation of the metering law can also arise from a degradation of the transmission chain from the electro-hydraulic member to the actuator.

This can be identified through several parameters within the control chain between the member transmitting the control current until the actuation of the metering member, particularly through the different metering member/flow rate correspondences, and the position gradient of the actuator (actuation speed).

This type of breakdown is very often attributed to a drift in the transformation of the control current into movement of the actuator, the servo-valve being responsible for this function.

All these source of the degradation of the metering law over time mar the metering performance of the hydromechanical unit.

E51-Pressurization of the Metering Device

The first verification is to compare the value of the parameter at an interval predetermined during design. This gives the state of health of the member. The two breakdown sources are either a sensor problem (which can be easily verified by cross-analysis of the voltages and currents, and of the overall state of the metering, and accommodated by a track switch) or a real breakdown (true breakdown or drift) of the pressurization member. The associated diagnostic function determines the output of the interval defined during design, to alert the central computer that a considerable degradation that has become a breakdown is located on the control valve member.

The second verification allows seeing the evolution starting with the entry into service of the member, and to determine the deterioration time of the performance until the border of the design interval at which the dispersion of ΔP has too great and impact on the fuel metering. This monitoring also allows analyzing the drift of this hydraulic parameter to identify either a breakdown (which is identified in any case because it has a strong impact on metering) or a degradation.

The degradation is identified by an ever greater dispersion amplitude around the nominal value or a dispersion leading to moving the nominal value.

E52-Flow Rate Measurement

The first verification is to compare the value of the flow rate measured by the flow rate meter to an interval predetermined during design. In the case where the measured value is outside the interval, this translates into a breakdown in the flow rate meter.

A second verification allows comparing the measured value to a reference value; if the difference between these two values is too high, that translates into a degradation of the flow rate meter.

E53-Metering Device Actuation Speed

The proper actuation speed of the metering device is also important in thrust variations in order to satisfy the operating laws of the engine.

The origin of the breakdown pointed out by this verification is more of the electro-hydraulic order (servo-valve) because it indicate a time for transforming the control current into hydraulic muscle that is longer than nominal. Moreover, this can be due to hydraulic circuits which suffer a lack of pressure for various reasons, or even leaks.

The diagnosis allows carrying out monitoring of the correspondence between the required position of the actuator (by position feedback) as opposed to the control sent to the electro-hydraulic member; as well as monitoring of the position gradient (actuation speed).

This allows detecting a drift of the electro-hydraulic control member and detecting the early stages of a degradation in order to report it to maintenance.

E54-Density Measurement

A good measurement of fuel density allows reconstructing a theoretical fuel flow rate with accuracy, and to improve the metering accuracy. The impacts of bad information from the density sensor are primarily on the metering accuracy and therefore a low risk to the control of the metered flow rate and finally to the operability of the engine. The density of the fuel depends essentially on the nature of the fluid, as well as on its temperature.

The first verification is therefore carried out on the capacity of the temperature sensor to give temperature information near the metering device which is located within the expected temperature interval.

There exists a fuel temperature model within the fuel system which depends to a great degree on parameters such as:

HP regime of the engine giving the rotation speed of the pump, the recirculation of this pump (throttling and local temperature increase) and its performance.

Effectiveness of the oil-fuel heat exchanger, temperature model of the oil system.

Fuel temperature upstream of the engine.

Outside air temperature and altitude.

If the measured temperature is not included in the expected interval, there are two reasons:

Either the fuel temperature is abnormally high, which indicates a breakdown connected either to the fuel-oil heat exchanger (FCOC for Fuel-Cooled Oil Cooler) or to a problem intrinsic to the oil system, either a fuel pump problem, or an over-temperature event of the nacelle compartment in which the system is located. In any case it raises an attention point for the maintenance operators. The analysis can use the oil thermal model.

Or the temperature sensor is dysfunctional (drift or breakdown), and the degraded mode returns to the current situation: an averaged fuel temperature.

The second verification depends on the means used to measure the density.

If the density is a function of temperature, there is no second verification step because automatically the response of the density sensor, depending on its functional state, will be all or nothing.

If the density is independent of temperature, it is a function of the measurement accuracy of the flow rate meter, this verification step depends on the hydraulic conditions for which the flow rate meter is designed and on its functional state.

The third verification step allows giving measurement reliability during a certain number of several successive flights, and aging of the means of density measurement.

Whether through the measurement of density or of temperature, this verification can moreover inform regarding the early stages of breakdowns within the oil circuit as previously described, and thus aid in prognosis.

Until the diagnosis identifies only a minor degradation, no action is performed. The results are only stored to be compared to the following iteration and thus create an evolution of the relevant parameters.

On the other hand, when a degradation of one of the sub-members seems too high as regards the identified difference between the nominal and measured values, an alarm is triggered for an analysis during maintenance.

Subsequent to the calculation of the residue and to the breakdown diagnosis in the case where the residue is greater than the determined alarm threshold, the diagnostic module 300 can proceed with a step E60 of consolidating the reconstructed flow rate measurement, for monitoring the metering law, particularly in the comparison of the approximate metered flow rate to the theoretical metering value defined and characterized during reception testing.

Thus, if the data vector ε1 is not reached, a consolidation of the reconstituted fuel flow rate Qcons is obtained by means of the different addend sensors (T, ρ, ΔP) with the acquisition of the mass flow rate. This is the most accurate solution for evaluating the aging of the metering law.

If the data vector ε1 is reached, the consolidation of the reconstituted fuel flow rate Qcons is accomplished with a reconstituted metering law in "degraded" mode, i.e. without the addition of the sensors improving the metering accuracy, with the information from the flow rate meter. In this calculation, the information of the latter can have greater weight.

There will therefore be a more or less accurate consolidation of the flow rate actually metered in the direction of the combustion chamber for each of the operating points monitored, allowing establishing a comparison with the performance of the system in its initial state.

The inaccuracies of the different sensors for improving the metering accuracy versus the accuracy of the flow rate meter itself as a function of the hydraulic conditions can be taken into account.

The value of the consolidate flow rate Qcons is then compared to a value of the reference flow rate Qth in a step E70.

The metering law is recorded individually of the hydro-mechanical member during production tests; a correspondence between the position of the metering device and the associated fuel flow rate constitutes a flow rate reference Qth corresponding to several flight phases previously invoked.

As long as the difference between Qcons and Qth is less than a determined threshold value, the results can be simply stored to be compared to the following iteration and thus create and evolution of the relevant parameters (step E80).

On the other hand, when the difference is too great with regard to the difference, an alarm can be can be triggered for an analysis during maintenance (step E90).

All of this monitoring allows preventing and characterizing the aging of sub-members, as well as identifying breakdowns in the process of establishment or dormant. The internal storage of this diagnosis in the apparatus allows the maintenance operator to enrich his knowledge of the apparatus over hours of flight, and especially to predict the programmed maintenance in a more agile manner, as well as to correctly evaluate the financial relevance at the micro scale of performing maintenance within the apparatus or order a replacement.

The invention claimed is:

1. A method for monitoring an operating state of a turbomachine hydro-mechanical unit of an aircraft, said hydro-mechanical unit comprising
   a metering valve, comprising a movable metering part and allowing a passage, through the metering valve, of a mass flow rate of fuel, depending in particular on a position of the movable part,
   a control valve, configured to maintain a predetermined pressure difference (ΔP) at terminals of the metering valve in order in particular to control the mass flow rate of fuel through the metering valve, and
   a flow rate meter able to measure the mass flow rate of fuel,
   wherein a monitoring module implements the method according to the following steps:
   determining a vector of reconstructed flow rates containing reconstructed flow rates for different stabilized points of a flight envelope of the aircraft based on the position of the movable part measured by a position sensor of said part, and on a measurement of a density of the fuel,
   calculating a vector of residues containing residues for the different stabilized points of the flight envelope of the aircraft, each residue corresponding to a difference between the mass flow rate as measured by the flow rate meter and the reconstructed flow rate of the vector of reconstructed flow rates for the same stabilized point of the flight envelope of the aircraft, and carrying out a first comparison of said vector of residues to a vector of determined threshold values for the different stabilized points of the flight envelope of the aircraft, and
   determining one or several abnormal operating state(s) of the hydro-mechanical unit depending on a result of the first comparison, and wherein, if a residue of the vector of residues is less than the determined threshold value of the vector of determined threshold values for the same stabilized point of the flight envelope of the aircraft, said residue is stored in a memory of the monitoring module.

2. The monitoring method according to claim 1, wherein the hydro-mechanical unit also includes
   a differential pressure sensor at the terminals of the metering valve configured to perform a measurement of differential pressure,
   a temperature sensor configured to perform a measurement of a temperature of the fuel,
   and wherein the vector of reconstructed flow rates is also determined based on the measurement of differential pressure measured by the differential pressure sensor and the measurement of temperature measured by the temperature sensor.

3. The monitoring method according to claim 2, wherein the determination of abnormal operating states of the hydro-mechanical unit includes the steps of
   carrying out a second comparison of at least one measurement among measurements of the temperature by the temperature sensor, measurements of the density performed by a sensor for measurement of the density, measurements of the position of the movable part of the metering valve by the position sensor and measurements of the differential pressure by the differential pressure sensor to a nominal interval of the respective sensor from which the at least one measurement is obtained, and
   determining a first abnormal operating state of the hydro-mechanical unit corresponding to a breakdown or to a degradation of the respective sensor, and/or to a breakdown or a degradation of an internal member of the hydro-mechanical unit associated with said respective sensor, depending on a result of the second comparison.

4. The monitoring method according to claim 3, wherein the method also includes the steps of
   carrying out a third comparison of the at least one measurement to a determined reference value of said respective sensor;
   determining a second abnormal operating state of the hydro-mechanical unit corresponding to a degradation of the respective sensor or of the internal member of the hydro-mechanical unit associated with said respective sensor, depending on the result of the third comparison.

5. The monitoring method according to claim 4, wherein the reference value is a value representative a previously measured valve.

6. The monitoring method according to claim 2, wherein the method also includes the steps of:

obtaining a consolidated vector of reconstituted fuel flow rates by improving an accuracy of the vector of reconstituted fuel flow rates by means of the measurements of the differential pressure, the temperature, the density, with the acquisition of the mass flow rate;

comparing the consolidated vector of reconstituted fuel flow rates to reference flow rate values; and if a difference between a flow rate of the consolidated vector of reconstituted flow rates and the reference flow rate value for the same stabilized point of the flight envelope of the aircraft is greater than a determined threshold value: determining a third abnormal operating state of the hydro-mechanical unit corresponding to a degradation of a metering law corresponding to a relationship between the position of the movable part of the metering valve and the mass flow rate through the metering valve.

7. A fuel control device configured to perform the method of claim 1, the fuel control device comprising the hydro-mechanical unit of the aircraft and the monitoring module.

8. The fuel control device according to claim 7, wherein the hydro-mechanical unit also includes a differential pressure sensor at the terminals of the metering valve, a temperature sensor configured to measure a temperature of the fuel, and wherein the monitoring module is configured to determine the vector of reconstructed flow rates taking into account differential pressure data measured by the differential pressure sensor and temperature data measured by the temperature sensor.

* * * * *